United States Patent
Kasahara et al.

(10) Patent No.: US 9,116,291 B2
(45) Date of Patent: Aug. 25, 2015

(54) INTEGRATED OPTICAL MODULE

(71) Applicants: NIPPON TELEGRAPH AND TELEPHONE CORPORATION, Tokyo (JP); NTT ELECTRONICS CORPORATION, Yokohama-shi, Kanagawa (JP)

(72) Inventors: Ryoichi Kasahara, Atsugi (JP); Atsushi Aratake, Atsugi (JP); Ikuo Ogawa, Atsugi (JP); Yusuke Nasu, Atsugi (JP); Yuichi Suzuki, Yokohama (JP); Shunichi Soma, Yokohama (JP)

(73) Assignees: NIPPON TELEGRAPH AND TELEPHONE CORPORATION, Tokyo (JP); NTT ELECTRONICS CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/416,208

(22) PCT Filed: Jul. 26, 2013

(86) PCT No.: PCT/JP2013/004566
§ 371 (c)(1),
(2) Date: Jan. 21, 2015

(87) PCT Pub. No.: WO2014/017107
PCT Pub. Date: Jan. 30, 2014

(65) Prior Publication Data
US 2015/0177457 A1 Jun. 25, 2015

(30) Foreign Application Priority Data
Jul. 26, 2012 (JP) .................. 2012-166085

(51) Int. Cl.
G02B 6/12 (2006.01)
G02B 6/26 (2006.01)
G02B 6/42 (2006.01)

(52) U.S. Cl.
CPC ........ *G02B 6/12* (2013.01); *G02B 2006/12083* (2013.01)

(58) Field of Classification Search
CPC ............. G02B 6/12; G02B 6/13; G02B 6/426
USPC .................... 385/14, 39, 50, 88, 92
See application file for complete search history.

(56) References Cited

U.S. PATENT DOCUMENTS

2010/0102107 A1*  4/2010  Kopp et al. ............. 228/176

FOREIGN PATENT DOCUMENTS

| JP | 2003-255196 | 9/2003 |
|---|---|---|
| JP | 2006-243391 | 9/2006 |

(Continued)

OTHER PUBLICATIONS

International Search Report in corresponding Application No. PCT/JP2013/004566 dated Aug. 20, 2013.

(Continued)

*Primary Examiner* — Ryan Lepisto
(74) *Attorney, Agent, or Firm* — Workman Nydegger

(57) ABSTRACT

An objective is to provide an integrated optical module which can avoid positional change and separation of a PLC chip when humidity changes. Provided is an integrated optical module characterized in that the integrated optical module includes: a PLC chip; a seat bonded and fixed to part of a lower surface of the PLC chip with an adhesive which is applied to an adhesion surface of the seat; and a support portion supporting the seat, in which a water-repellent treatment portion is provided by masking an upper portion of the support portion with a water-repellent material. The water-repellent treatment portion is provided only around the seat for a predetermined width. The water-repellent treatment portion is provided around the seat for a width of 100 μm or more.

3 Claims, 8 Drawing Sheets

(56) References Cited

FOREIGN PATENT DOCUMENTS

| JP | 2008-164828 | 7/2008 |
| JP | 2009-175364 | 8/2009 |
| JP | 2011-248048 | 12/2011 |

OTHER PUBLICATIONS

International Preliminary Report on Patentability and Written Opinion in corresponding application No. PCT/JP2013/004566 dated Jan. 27, 2015.

* cited by examiner

INTEGRATED OPTICAL MODULE

TECHNICAL FIELD

The present invention relates to an integrated optical module, and relates to an integrated optical module mounted with a planar light circuit which is integrated together with a light emitting element or a light receiving element and forms an optical transmitter or receiver.

BACKGROUND ART

With the development of optical communication technology, development of optical components is becoming more and more important. Above all, an optical transmitter or receiver is increased in its transmission speed and response speed, and has a larger communication capacity. In a configuration of a typical transmitter or receiver, the transmitter or receiver includes a light emitting element or a light receiving element fabricated using optical semiconductor, and an output or input optical fiber, and they are optically coupled to each other via a lens. For example, in a case of an optical receiver, light emitted from the input optical fiber is focused on the light receiving element by the lens, and is directly detected (intensity detection).

Turning to a modulation and demodulation processing technique for an optical transmission system, signal transmission using a phase modulation method is in wide practical use. A phase shift keying (PSK) method is a method for transmitting a signal through modulation of the phase of light. The PSK method can achieve much larger transmission capacity than before by way of multi symbol modulation or the like.

In order to receive such a PSK signal, the phase of light needs to be detected. The light receiving element can detect the intensity of signal light, but cannot directly detect the phase of the light. Hence, a means for converting the phase of light into light intensity is needed. For example, there is a method for detecting phase difference by using interference of light. Information on the phase of light can be obtained by causing signal light to interfere with other light (reference light) and detecting the light intensity of interfering light. There are coherent detection and differential detection. In the coherent detection, a light source prepared separately is used as the reference light. In the differential detection, part of signal light is branched off and is used as reference light, and the signal light is caused to interfere with the reference light. As described above, unlike a conventional optical receiver using only an intensity modulation method, a recent optical receiver using the PSK method needs an optical interference circuit which converts phase information into intensity information through interference of light.

Such an optical interference circuit can be achieved using a planar light circuit (PLC). The PLC delivers superior features in terms of mass productivity, low cost, and high reliability, and can be used as various types of light interference circuit. In fact, as an optical interference circuit used in a PSK optical receiver, an optical delay interference circuit, a 90-degree hybrid circuit, and the like are offered and in practical use. Such a PLC is fabricated by a glass deposition technique such as standard photography, etching, and FHD (Flame Hydrolysis Deposition).

In a specific manufacturing process, first, an under-cladding layer made mainly of silica glass or the like and a core layer having a higher refractive index than the under-cladding layer are deposited on a substrate made of Si or the like. Thereafter, various patterns of waveguides are formed on the core layer. Lastly, the waveguides are embedded by an over-cladding layer. A PLC chip having a waveguide-type optical functional circuit is fabricated by such a process. Signal light is encapsulated in the waveguides fabricated by the above process and propagated within the PLC chip.

FIG. 1 shows a conventional method for optically connecting a PLC and an optical receiver. Simple fiber connection as shown in FIG. 1 is employed as a basic method for connection of a PLC and an optical receiver in a PSK optical receiver. Optical coupling is established by connecting a planar light circuit (PLC) 1, which is connected at its input end to an optical fiber 3a, and an optical receiver 2 to each other with optical fibers 3b. The number of optical fibers 3b used for the optical coupling is determined by the number of output light beams outputted from the PLC. Multiple optical fibers are used for the optical coupling in some cases. For this reason, such a configuration of an optical receiver using optical fiber connection may have too large a size. To overcome such a problem in the configuration, the optical receiver can be reduced in size by coupling the output of the PLC and the input of the optical receiver with no optical fiber interposed therebetween and by integrating all into one package. Such a form of an optical receiver in which the PLC and the optical receiver are optically coupled together directly is called an integrated optical module.

To obtain an integrated optical module, how to fix the PLC chip is particularly important. In a case of optically coupling light outputted from the PLC chip and propagated in airspace to a light receiving element by a lens or the like, if the positional relation among the end of light emission from the PLC chip, the lens, and the light receiving element changes, not all of the light can be received by the light receiving element, causing a loss. Such a loss problem is especially noticeable when ambient temperature changes to change the temperature of the package housing the optical receiver, the temperature of each element, and the like, and their positions change due to the influence of thermal expansion. To achieve optical coupling with low loss, it is necessary that the positional relation among the components does not change, at least not relative to each other, even if ambient temperature or the like changes.

In particular, the PLC chip occupies more area in the optical receiver than the light receiving element by about one to two digits, and is therefore more likely to change in shape due to the thermal expansion. Further, a substrate and a deposited thin-film glass which constitute the planar light circuit are largely different in their coefficients of thermal expansion, and therefore temperature change causes large warpage. For this reason, changes in the position and angle of light emitted from the PLC chip relative to the light receiving element are really problematic. These two changes cause the position and angle of light emitted from the planar light circuit to change, leading to displacement in the optical axis. The displacement in the optical axis deteriorates optical coupling of the PLC chip to the light receiving element, and causes a loss. In order to achieve an integrated optical module, it is important to overcome such displacement in the optical axis or to render the displacement harmless.

FIG. 2 shows an internal structure of a conventional integrated optical module. There is known a method for securely fixing the almost entire bottom surface of the PLC chip so that the aforementioned optical-axis displacement may not occur when temperature changes. In the integrated optical module shown in FIG. 2, a PLC chip 13 in which an optical interference circuit is formed as an optical functional circuit, a lens 14, and a light receiving element 15 are fixed to a base substrate 11 with fixing mounts 12a, 12b, 12c as support members, respectively. An optical fiber 16 and the PLC chip 13 are connected to each other via an optical-fiber fixing component 17. In this integrated optical module, light inputted from the optical fiber 16 interferes in the PLC chip 13, and is then coupled to the light receiving element 15 by the lens 14.

The fixing mount 12a and the PLC chip 13 are fixed together by an adhesive 18 or solder. The almost entire bottom surface of the PLC chip 13 is securely fixed to the fixing mount, so that temperature-related expansion or warpage is suppressed. Further, the lens 14 and the light receiving element 15 are also fixed to their fixing mounts, so that the optical axis may not be displaced when temperature changes.

The configuration shown in FIG. 2 can suppress or sufficiently reduce the optical-axis displacement caused by temperature change, but makes noticeable the change in the properties of the PLC chip due to temperature change. As described earlier, the planar light circuit 13 includes a Si substrate 13a and a silica glass layer 13b which are largely different in their coefficients of thermal expansion, and are likely to suffer from great warpage or thermal expansion when temperature changes. In the configuration shown in FIG. 2, thermal expansion and warpage are suppressed because the entire bottom surface of the PLC chip 13 is fixed.

On the other hand, in this case, a large thermal stress is generated between the Si substrate 13a and the silica glass layer 13b. This stress causes change in the refractive index in the silica glass layer 13b through a photo-elastic effect. In the light interference circuit formed in the PLC chip 13, the lengths of waveguides and the refractive indices are precisely adjusted in order to control interference property. The change in the refractive index caused by the stress brings about a change in an equivalent circuit length to change the properties of an interferometer, and consequently, deteriorates the properties of the optical interference circuit.

If, in order to suppress the change in optical properties by suppressing the occurrence of thermal stress, an elastic adhesive, a soft adhesive such as paste, or a fixing paste is used as the adhesive 18 (see, for example, PTL 1), the aforementioned influence on the optical-axis displacement becomes noticeable, and this causes loss.

CITATION LIST

Patent Literature

PTL 1: Japanese Patent Laid-Open No. 2009-175364

SUMMARY OF INVENTION

Technical Problem

To solve the above problems, a configuration shown in FIG. 3 has been proposed to be employed in an integrated optical module in which optical components such as a PLC chip are integrated. In this configuration, an adhesive 38 is applied to a seat formed by raising part of a fixing mount 32a, and a PLC chip 33 is bonded and fixed to the base. Other configurations in FIG. 3 are similar to those in FIG. 2. Specifically, an optical fiber 36 is connected to the PLC chip 33 via an optical-fiber fixing component 37, and optical components such as the PLC chip 33, a lens 34, and a light receiving element 35 are mounted on a base substrate 31 via fixing mounts 32a, 32b, 32c. By such a configuration, even if deformation or warpage occurs in the PLC chip due to temperature change, the optical functional circuit is affected by the stress only to a minimum degree. Thus, deterioration in the properties of the optical functional circuit can be suppressed.

However, in this integrated optical module, as shown in FIG. 4A, if the adhesive 38 for connecting the PLC chip 33 to a seat portion 42 of a mount 40 is applied too much, the adhesive 38 overflows around the seat portion 42 and hardens. The overflowing adhesive 38 is likely to concentrate around the seat by its adhesive property, and does not spread over the mount but stays around the adhesion surface from which the adhesive 38 has overflowed. FIG. 4B is a top view of the mount. As shown in FIG. 4B, the seat 42 of square section is provided on part of the mount. Thus, the overflowing adhesive stays along the four sides of the seat. Since the adhesion surface between the seat 42 and the PLC chip 33 is very small, in order to control the amount of the adhesion precisely, the amount has to be controlled on a μl level. In addition, generally, metals do not change much in volume when humidity changes, but resins change in volume much when humidity changes. When humidity changes, the adhesive 38 made of a resin swells, but the seat 42 of the mount 40 made of a metal does not change in volume. Hence, if humidity changes with the overflowing adhesive staying around the adhesion surface, the overflowing adhesive 38 swells to generate force F pushing up the PLC chip 33. This serves as a cause for positional change and separation of the PLC chip. Note that the section of the seat referred to herein is a section viewed from the upper surface of a support portion 41 of the mount 40.

In view of above, the present invention has an objective of providing an integrated optical module which can avoid positional change and separation of a PLC chip when humidity changes.

Solution to Problem

To solve the above problem, an invention described in one embodiment provides an integrated optical module characterized in that the integrated optical module comprises: a PLC chip; a seat bonded and fixed to part of a lower surface of the PLC chip with an adhesive which is applied to an adhesion surface of the seat; and a support portion supporting the seat, in which a water-repellent treatment portion is provided by masking an upper portion of the support portion with a water-repellent material.

In the above integrated optical module, the water-repellent treatment portion is preferably provided only around the seat.

In the above integrated optical module, the water-repellent treatment portion is preferably provided around the seat for a width of 100 μm or more.

DESCRIPTION OF EMBODIMENTS

Embodiments of the present invention are described in detail below.

Figure 1:
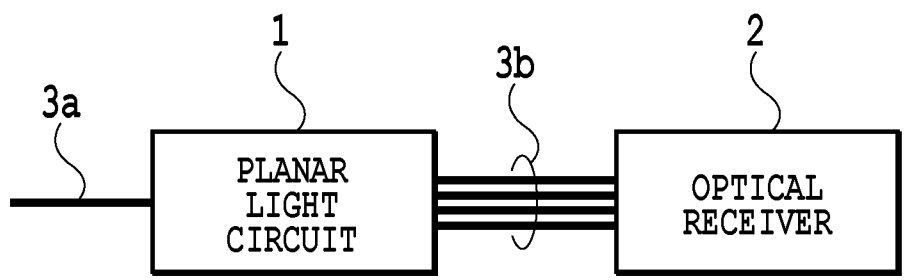
FIG. 1 is a diagram showing a conventional method of optical connection between a planar light circuit and an optical receiver.
Figure 2:
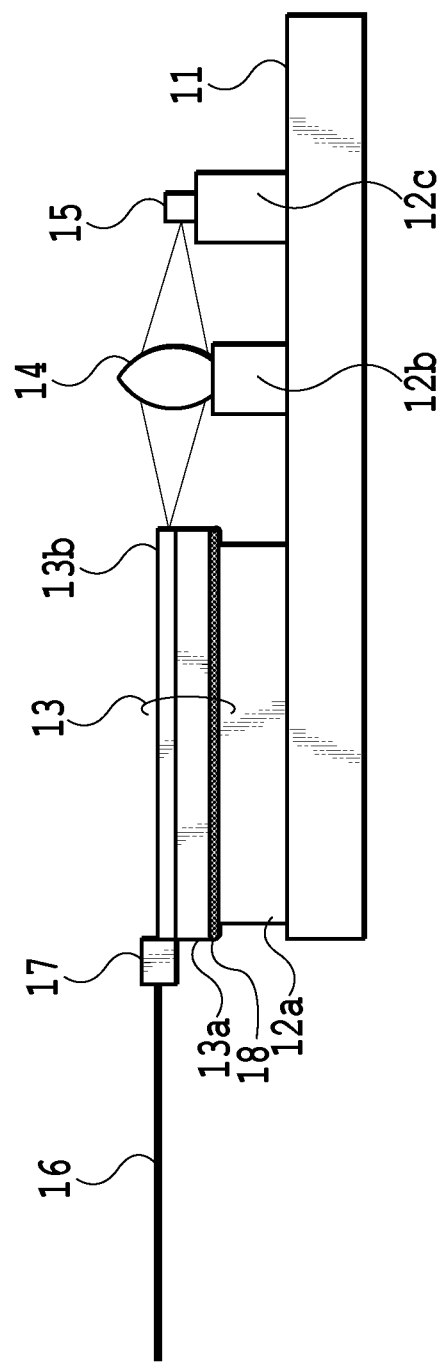
FIG. 2 is a diagram showing an internal structure of an example of a conventional integrated optical module.
Figure 3:
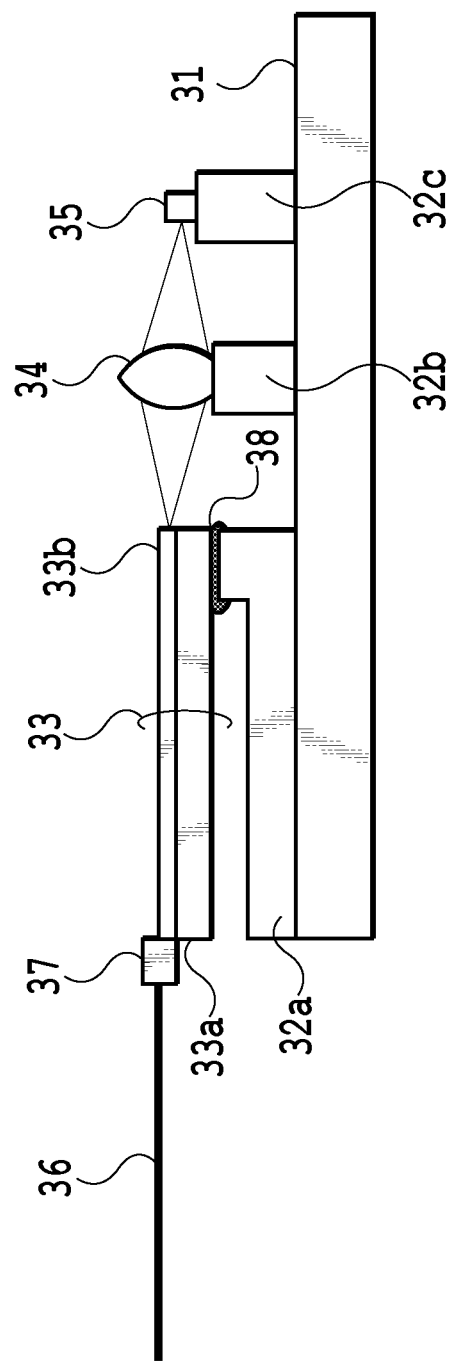
FIG. 3 is a diagram showing an internal structure of another example of a conventional integrated optical module.
Figure 4A:
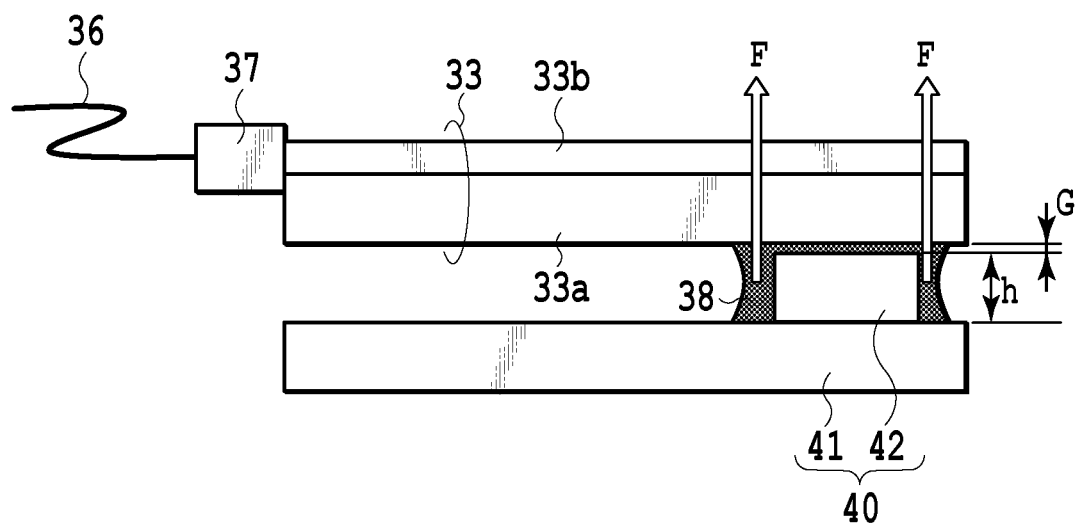
FIG. 4A is a diagram illustrating positional change and separation of the PLC chip in the conventional integrated optical module.
Figure 4B:
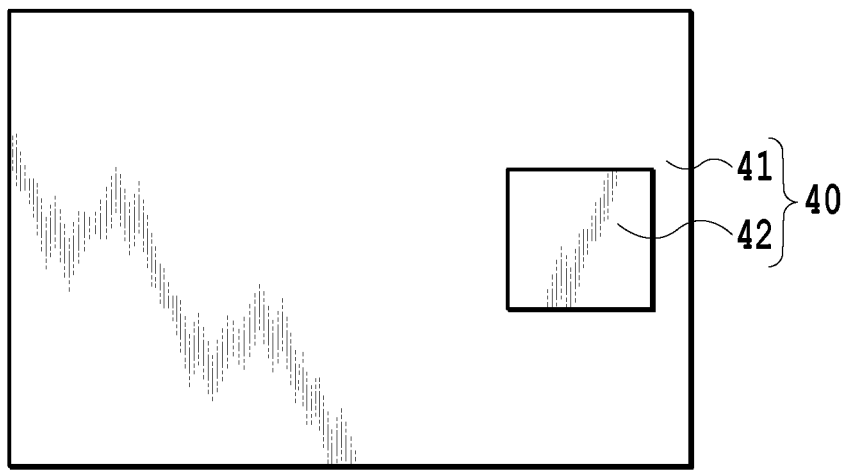
FIG. 4B is a diagram illustrating positional change and separation of the PLC chip in the conventional integrated optical module.
Figure 5A:
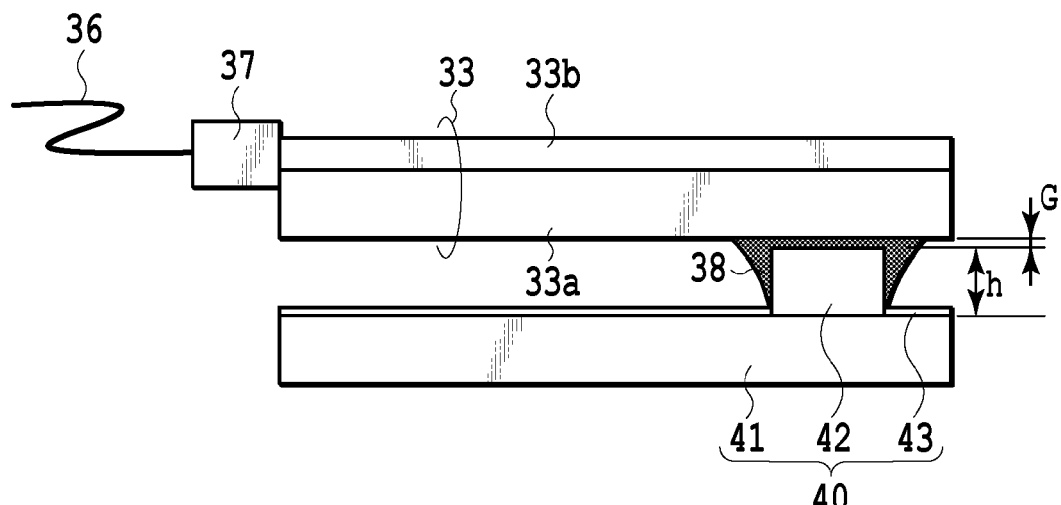
FIG. 5A is a side sectional view showing an internal structure of an example of an integrated optical module of a first embodiment.
Figure 5B:
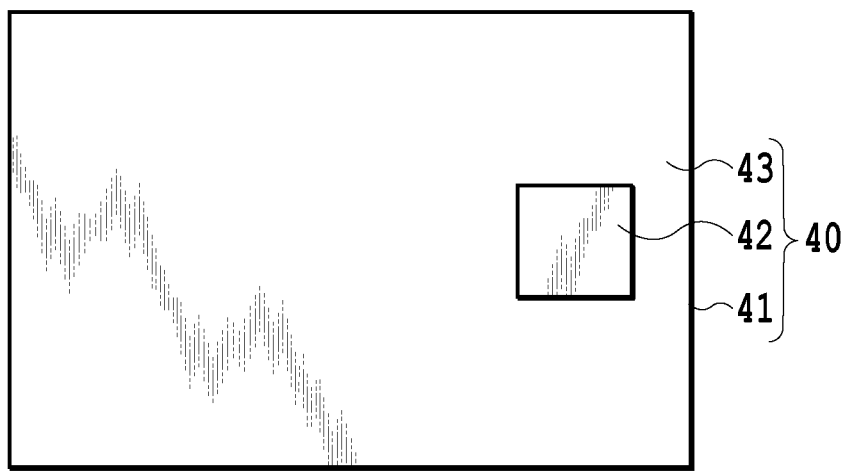
FIG. 5B is a top view showing the internal structure of the example of the integrated optical module of the first embodiment.

FIGS. 5A and 5B are each a diagram showing a main portion of an integrated optical module of a first embodiment. FIG. 5A is a side sectional view showing a schematic configuration of the main portion of the integrated optical module of the first embodiment, and FIG. 5B is a top view of a mount used in the integrated optical module of the first embodiment. The integrated optical module is configured such that optical components, such as a PLC chip, a lens, and a light receiving element or a light emitting element, are mounted on a base substrate via mounts, and these components are sealed by a package. As shown in FIG. 5A, a PLC chip 33 on which an optical interference circuit is formed is connected to an optical fiber 36 via a fiber-fixing component 37, and is bonded and fixed to a mount 40 with an adhesive 38a.

The PLC chip 33 is formed such that a silica glass layer 33b is stacked on a Si substrate 33a. The silica glass layer 33b has formed thereon an optical functional circuit in waveguide formed by a core and claddings. The adhesive 38 may be, for example, any of an epoxy adhesive that hardens with heat, an adhesive that hardens with moisture, and an adhesive that hardens with oxygen.

The mount 40 can be formed from a metal such as Kovar, and includes a plate-shaped support portion 41 to be mounted on the base substrate, a seat 42 formed by raising part of an upper surface of the plate-shaped support portion 41, and a water-repellent treatment portion 43 provided on the upper surface of the support portion 41. An adhesive 38 is applied to an adhesion surface which is an upper surface of the seat 42 of the mount 40. The PLC chip 33 is bonded and fixed, at part of its lower surface, to the upper surface of the seat 42. In the integrated optical module of the present invention, the water-repellent treatment portion is provided on the upper surface of the support portion 41 of the mount 40. Thus, the adhesive 38 overflowing from the adhesion surface between the PLC chip 33 and the mount 40 does not spread over the upper surface of the support portion 41 of the mount 40, so that almost no adhesive 38 exists from the PLC chip 33 to the support portion 41 of the mount 40. While the mount 40 is made of a metal, the adhesive is made of a resin. Thus, only the adhesive swells when the humidity increases. Since the water-repellent treatment portion 43 is formed around the seat 42, the adhesive 38 overflowing from the adhesion surface does not spread over the upper surface of the support portion 41 of the mount 40, and does not exert a pressure pushing up the PLC chip 33 when swelling. Thus, positional change and separation of the PLC chip 33 do not occur. This is due to the following reason. Specifically, since almost no adhesive 38 spreads over the upper surface of the support portion 41 of the mount 40, a large interface exists between the adhesive 38 and airspace. Thus, even if the adhesive 38 swells, there is a room for the adhesive 38 to swell and spread, and therefore pressure is relieved.

Figure 6:
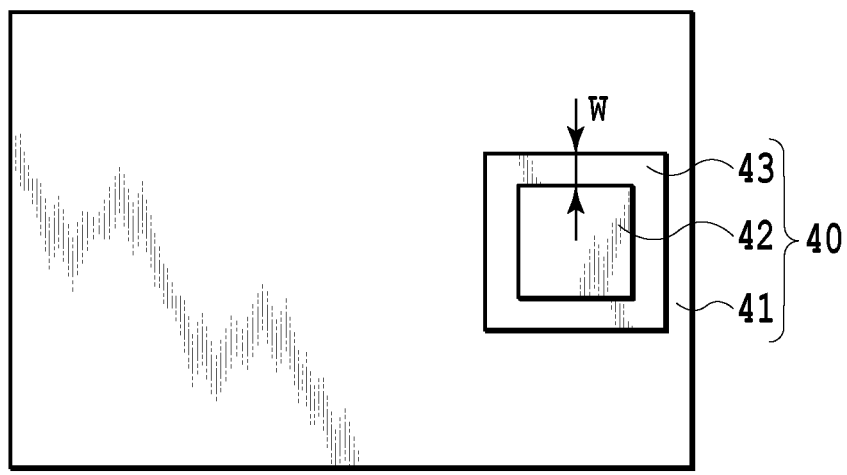
FIG. 6 is a diagram showing an example where a water-repellent treatment portion is provided on part of a mount.

As shown in FIG. 6, the water-repellent treatment portion may be provided not on the entire upper surface of the support portion 41, but only on part thereof. FIG. 6 is the same as FIG. 5B, except for the arrangement of the water-repellent treatment portion. For example, the water-repellent treatment portion 43 is provided only around the seat 42 to have a predetermined width. For example, the water-repellent treatment portion may be provided to have a width of 100 microns or more.

A resin that repels the adhesive 38 is used as a resin material used to form the water-repellent treatment portion 43. For example, a silicone resin, a fluororesin, an acrylic resin, wax, or the like can be used as a resin material used to form the water-repellent treatment portion 43. The water-repellent treatment portion 43 is provided by masking the seat and applying a water-repellent treatment agent to the upper surface of the mount.

The sectional shape of the seat 42 is not limited to a square as shown in FIG. 5B, but may be any shape such as a circle. However, if the section is square as shown in FIG. 5B, a large adhesive area can be obtained to achieve stable adhesion between the seat 42 and the PLC chip 33.

According to the embodiment described above, the water-repellent treatment portion 43 is provided on the plate portion 41 of the mount 40 to prevent the adhesive from spreading over the plate portion 41 of the mount 40. Thus, the overflowing adhesive 38 does not exert a pressure pushing up the PLC chip when swelling, and therefore, positional change and separation of the PLC chip 33 do not occur.

Although the support portion and the seat which constitute the mount are integrally formed in the above embodiments as an example, the seat may be bonded to the upper surface of the support portion with an adhesive.

REFERENCE SIGNS LIST

33 PLC chip
33a Si substrate
33b silica glass layer
36 optical fiber
37 fiber-fixing component
38a, 38b adhesive
40 mount
41 support portion
42 seat
43 water-repellent treatment portion

The invention claimed is:

1. An integrated optical module comprising:
   a PLC chip;
   a seat bonded and fixed to part of a lower surface of the PLC chip with an adhesive which is applied to an adhesion surface of the seat; and
   a support portion supporting the seat, wherein a water-repellent treatment portion is provided by masking an upper portion of the support portion with a water-repellent material.

2. The integrated optical module according to claim 1, wherein the water-repellent treatment portion is provided only around the seat for a predetermined width.

3. The integrated optical module according to claim 2, wherein the water-repellent treatment portion is provided around the seat for a width of 100 μm or more.

* * * * *